UNITED STATES PATENT OFFICE.

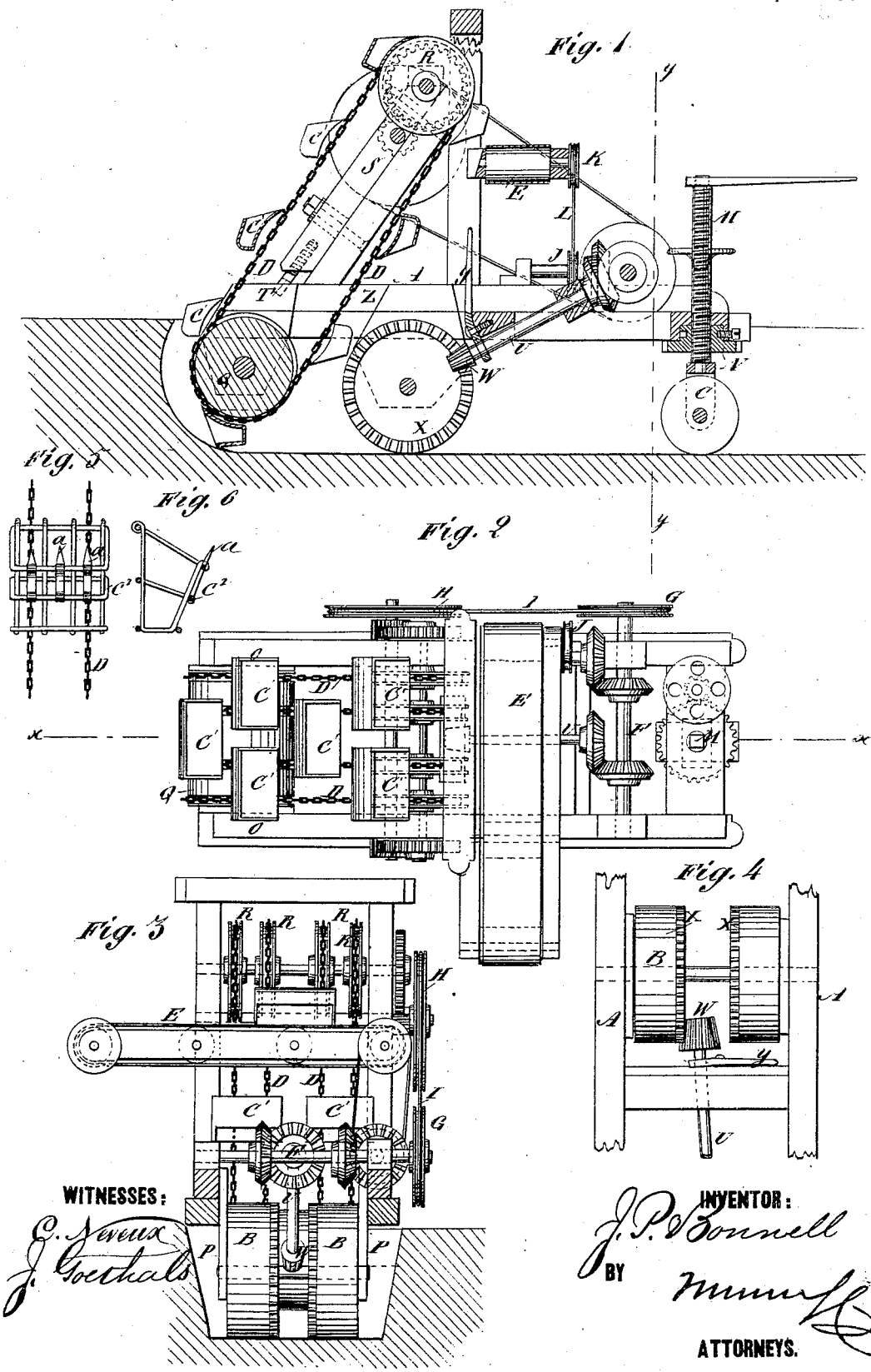

JOHN P. BONNELL, OF ELIZABETH, NEW JERSEY.

IMPROVEMENT IN EXCAVATORS.

Specification forming part of Letters Patent No. 178,901, dated June 20, 1876; application filed May 16, 1876.

*To all whom it may concern:*

Be it known that I, JOHN P. BONNELL, of Elizabeth, in the county of Union and State of New Jersey, have invented a new and Improved Excavating-Machine, of which the following is a specification:

My invention relates to a machine which is movable on wheels along the ground, and contains an endless chain of buckets, which dig the earth and carry it up to a laterally-working endless discharger, the buckets of which being fed or moved up to the work by the power which moves the machine along the ground.

The essential part of my invention consists of a machine arranged on feeding or propelling wheels as a fulcrum, with a contrivance for elevating and lowering the buckets in advance of the fulcrum to gage the machine for grading ascending or descending inclines; also, for running it into and out of the ground in using it for ditching purposes. My invention also consists in the buckets being extended outward, at each side, beyond the ends of the drum, over which the said chains work to cut their way in advance of the carrying-wheels sufficiently wider than the latter and their housings to enable it to run freely.

In the annexed drawing, Figure 1 is a longitudinal sectional elevation of my improved excavating-machine, taken on line X X of Fig. 2. Fig. 2 is a plan view, and Fig. 3 is a transverse sectional elevation, taken on line Y Y of Fig. 1. Fig. 4 is a detail plan view. Fig. 5 is a front elevation, and Fig. 6 a section, of a skeleton-bucket, which I propose to use with or without the close buckets.

In the drawing, A is the frame, which is mounted on the traction-wheels B and a caster-wheel, C, and carries the excavating and elevating buckets $C^1$ on endless chains D, also the endless discharger E, and means for driving them, which in this example consist of the driving-shaft F, to be worked by steam or other power, pulleys G H and belt I for working the buckets, and pulleys J K and belt L for working the discharger. The caster-wheel is mounted on a vertically-adjustable standard, M, to shift the buckets up and down by tilting the frame on the traction-wheels B to adapt the machine to level or inclined grades.

The standard M is, in this case, made adjustable by the screw-nut N, but other means may be employed. O represents the extensions of the buckets, outside of the housings P, to widen the trench beyond the width of the carrying-wheels and the housings of the lower elevator-drum Q for affording the necessary freedom for the passage of the machine when making deep ditches. This extension may be made by elongating the whole end of the bucket, or attaching a lip to the outer end. The frame is notched at $z$ to allow these extensions to pass.

The buckets are each made considerably narrower than the total width of the elevators, and they are arranged in two or more rows, side by side, and so placed that the buckets of the different rows act in alternate succession to distribute the labor and to enable the buckets to be made lighter than they would require to be if extended the whole width of the elevator.

For very strong buckets, adapted for raising stones, roots, &c., I propose to employ skeleton-buckets $C^2$, with strong points, adapted to dig up the stones.

The lower drum Q of the elevator is arranged in stationary bearings, but the upper one, R, is mounted in the sliding supports S, which are provided with adjusting-screws T to tighten the chains when required. The power is communicated to the traction-wheel by the shaft U, which gears, by a bevel-pinion, W, with a beveled toothed rim, X, on one or the other of the wheels, according to which way the machine is desired to run, forward or backward, said shafts being fixed to shift back and forth between the wheels at will by a lever, Y.

Having thus described my invention, what I claim as new, and desire to secure by Letters Patent, is—

1. The frame of a movable excavating-machine, mounted in a pair of traction-wheels as a fulcrum, between the point of digging and the adjusting-caster, and provided with a wheel, C, and mechanism for adjusting the frame up and down on said wheel to adjust the excavator for levels or inclines or grades, substantially as specified.

2. The buckets of the endless elevators of my movable excavating-machine, extending outward or laterally beyond the housings P, in order to enable the machine to work in a trench made by itself, substantially as specified.

JOHN P. BONNELL.

Witnesses:
A. P. THAYER,
ALEX. F. ROBERTS.